INVENTOR
ERWIN STARMÜHLER
BY Dicke & Craig
ATTORNEYS

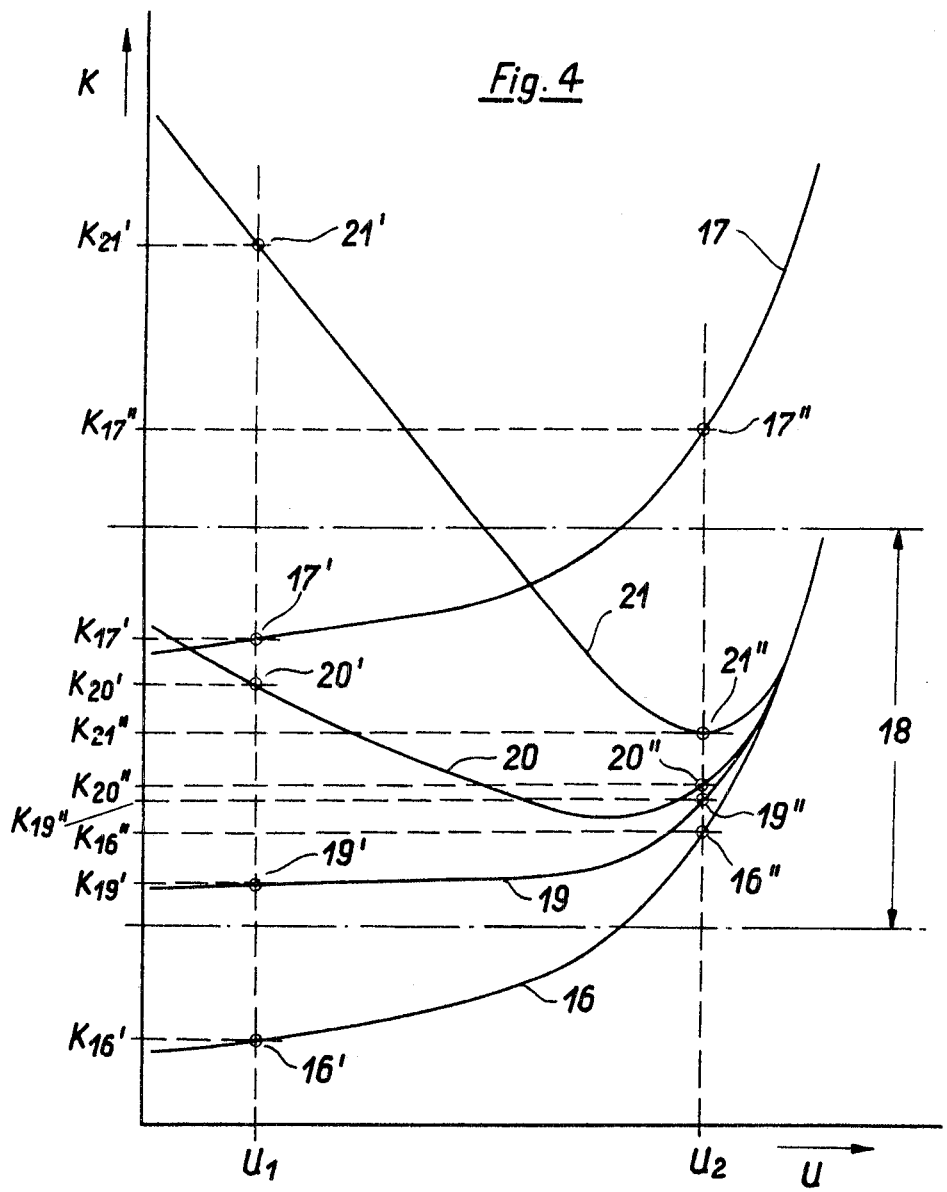

United States Patent Office
3,510,060
Patented May 5, 1970

3,510,060
TEMPERATURE REGULATING DEVICE FOR
INTERNAL COMBUSTION ENGINES
Erwin Starmühler, Munich, Germany, assignor to
Bayerische Motoren Werke A.G., Munich, Germany
Filed Mar. 25, 1966, Ser. No. 537,488
Claims priority, application Germany, Mar. 27, 1965,
B 81,197
Int. Cl. F01p 7/16
U.S. Cl. 236—34.5                                 6 Claims

ABSTRACT OF THE DISCLOSURE

A temperature regulating device for a mixture wherein media of different temperatures are applied to a mixing chamber containing a temperature responsive mixing valve arrangement wherein the media are combined in a predetermined ratio dependent upon temperature sensed by the valve arrangement being responsive to the media of different temperatures in a ratio different from the quantity ratio of the media forming the mixture.

---

The present invention relates to a temperature-regulating device for a mixture consisting of several media of different temperature, and more particularly to a thermostat for the cooling system of internal combustion engines, having a temperature-sensing device whose surface is acted upon the aforementioned media.

The present invention is based on the aim to avoid and eliminate the disadvantageous influence on the thermostat regulating values by different values of an influencing temperature, especially by the ambient winter and summer temperature of the surrounding or atmospheric air in cooling installations for internal combustion engines, which has been counteracted up to now in a complicated manner by the exchange or re-adjustment of the temperature-regulating device, and instead to automatically control the variation of the regulating value in dependence on the change of an influencing temperature such as the surrounding or ambient temperature and in dependence on the changing radiator discharge temperature in internal combustion engines connected therewith. Above all, the disadvantageous property of customary, conventional temperature-regulating devices is to be eliminated thereby, namely that with low values of an influencing temperature a lower regulating temperature becomes effective than with higher values of this influencing temperature, which may be traced back to the fact that by reason of the necessary regulating range of a temperature-regulating device, a small quantity of a medium having a low temperature, by a slight adjustment of the device's valve, maintains the regulating value and therewith the regulating temperature, at the lower limit of the regulating range.

As solution to the underlying problems, the present invention essentially consists with a temperature-regulating device of the type described above in that the ratio of the surfaces of the temperature-sensing device acted upon by the different media is different from the quantity ratio of the media forming the mixture. By matching there two ratios to each other, the influence of the changeable temperature of one medium can be made to be effective in such a manner that the regulating temperature remains uninfluenced or unaffected by the change of the temperature of one medium, or that this temperature change of one medium even effects a change of the regulating temperature in the reverse sense. Thus, it is possible by the present invention to maintain constant the regulating temperature with changes in the temperature of one of the media, or even to cause the regulating temperature to increase with, for example, a dropping temperature of one medium or vice versa. The latter possibility provides with motor vehicles that, on the one hand, in cold weather an enhanced effect of a heating system for the vehicle passenger space fed with the same cooling medium as the internal combustion engine may be attained and, on the other, in hot weather an enhanced cooling of the internal combustion engine and a decrease of the lubricating oil temperature may be achieved. Already in case of a matching with a constant regulating temperature, the otherwise necessary adjusting work for summer and winter operation may be dispensed with. Consequently, the danger is also eliminated by the present invention that the thermostat is not adjusted or exchanged in time with a rapid change of the ambient or surrounding temperature, for example, when driving through mountains with motor vehicles.

According to a further development and feature of the present invention, it is proposed with a temperature-regulating device whose temperature-sensing device is arranged within a space which is provided with inlet apertures for the media to be mixed whereby one of these inlet apertures is controlled by a valve actuated by the temperature-sensing device to which is secured the temperature-sensing device, that the temperature-sensing device extends beyond this valve into a space that contains one of the media to be mixed. As a result of such a construction, one of the media to be mixed may act alone upon the part of the temperature-sensing device extending beyond the valve whereas the remaining part of the temperature-sensing device is acted upon by the media to be mixed corresponding to the mixture proportions thereof. A change of the temperature of the one medium which acts alone upon apart of the temperature-sensing device, thus effects a change of the regulating temperature to be adjusted by the temperature-regulating device.

For the purpose of the application of a temperature-regulating device according to the present invention as thermostat for circulation cooling systems of internal combustion engines, whereby the thermostat is constructed as mixture-regulating device having two valves which control or valve alternately the supply of the cooling medium to the engine from a line containing or including the radiator and from a by-pass or short-circuit line by-passing the radiator, the present invention proposes that the temperature-sensing device extends through the valve which controls the line containing the radiator. In this manner the temperature to be adjusted by the thermostat of the cooling medium supplied to the engine is influenced in the aforementioned advantageous manner by the cooling medium component coming from the radiator and therewith in dependence on the ambient temperature because the cooling medium portion or component flowing through the radiator changes its temperature in dependence on the prevailing outside or ambient temperature. It has been found as advantageous that the temperature-sensing device is arranged with an effective surface portion of 10 to 40% thereof in the space into which discharges the line containing the radiator.

A second embodiment according to the present invention essentially consists with a temperature-regulating device whose temperature-sensing device is arranged in a space into which flow media to be mixed therein through two supply lines alternately controlled by the temperature-sensing device by means of valves and from which flow off the mixed media through an unvalved aperture, in that one of the two supply lines is connected directly with the discharge line leading out of the aforementioned space by means of a further-by-pass line branching off from the one supply line upstream of the inlet aperture thereof into the space containing the temperature-sensing device and that this further by-pass line is controlled by a further valve actuated by the temperature-sensing device in the same sense as the valve at the inlet aperture of this supply line.

With the application of this construction of a temperature-regulating device as thermostat for circulatory cooling systems of internal combustion engines whereby the thermostat is constructed as mixture-regulating device having two valves which alternately controls the supply of the cooling medium to the engine from a line containing the radiator and from a by-pass or short-circuit line by-passing the radiator, according to a further feature of the present invention the further by-pass line connects the short-circuiting line with the engine supply line. This further construction according to the present invention keeps a portion of one of the media to be mixed from influencing the temperature-sensing device whereby the influence thereof on the regulating temperature to be adjusted by the temperature-regulating device is decreased whereas the proportionate influence of the second cooling medium portion is correspondingly enchanced. With temperature changes of the last-mentioned cooling medium portion, the same effect is produced with this construction as with the first-described construction.

Accordingly, it is an object of the present invention to provide a temperature-regulating device, especially a thermostat for the cooling system of internal combustion engines which eliminates by simple and operationally reliable means the aforementioned shortcomings and drawbacks encountered with the prior art constructions.

Another object of the present invention resides in a temperature-regulating device for the cooling system of internal combustion engines which obviates the need for readjustments and/or exchanges of the thermostat for winter and summer operation of the vehicle.

A further object of the present invention resides in a temperature-regulating device, especially a thermostat for the cooling system of internal combustion engines, in which the change in the regulating value takes place automatically in dependence on the changes of an influencing temperature, such as the atmospheric or ambient temperature.

A still further object of the present invention resides in a temperature-regulating device whose regulating temperature remains substantially uninfluenced by changes in the temperature of one of the several media influencing the regulating device.

Still a further object of the present invention resides in a thermostatic temperature control for the cooling system of internal combustion engines which, in case of cold weather automatically causes a greater effectiveness of the heating system whereas with hot weather it produces an enhanced cooling of the internal combustion engine and a decrease of the lubricating oil temperature.

These and further objects, features, and advantages of the present invention will become more obvious from the following description when taken in connection with the accompanying drawing which shows, for purposes of illustration only, several embodiments in accordance with the present invention, and wherein.

Figure 3:
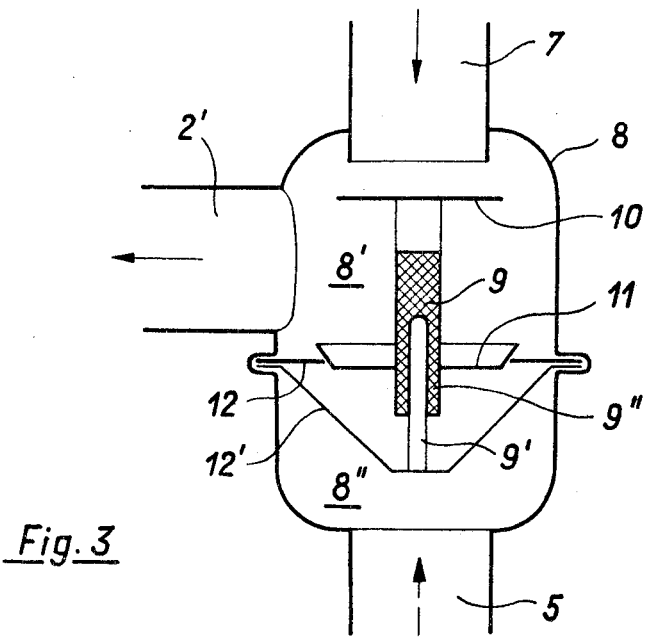

FIG. 3 is a somewhat schematic cross-sectional view through a modified embodiment of a thermostat in accordance with the present invention provided with a temperature-sensing and expanding element extending on both sides of a disk valve; and FIG. 4 is a diagram of the cooling medium-temperature-regulating curves of different thermostat constructions in dependence on the surrounding or ambient temperature.

Figure 1:
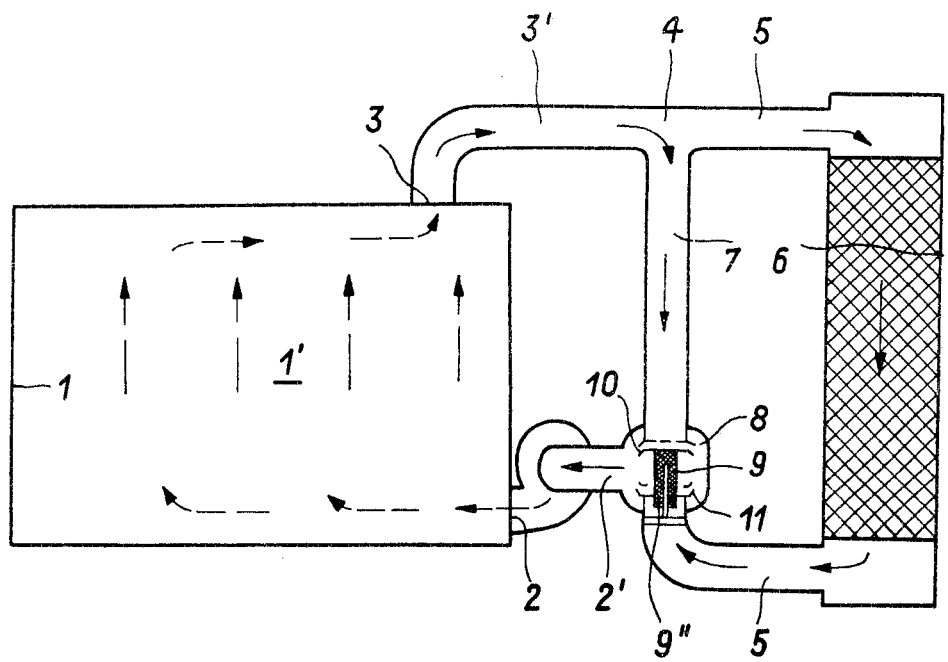
FIG. 1 is a schematic diagram of a liquid circulatory cooling system for an internal combustion engine.

Referring now to the drawing wherein like reference numerals are used throughout the various views to designate like parts, and more particularly to FIG. 1, reference numeral 1 designates therein a conventional internal combustion engine having a cooling jacket 1'. The cooling medium flows through the cooling jacket 1' from the bottom toward the top of the internal combustion engine 1 whereby heat is transferred to the cooling medium while the engine is cooled thereby. The cooling medium enters the cooling jacket 1' within the lower area through the inlet 2 and leaves the cooling jacket 1' through the discharge 3. A discharge line 3' adjoining the discharge 3 conducts the cooling medium to a line bifurcation 4 from which the line branch or section 5 leads to the radiator 6 and a by-pass line branch or section 7 leads directly to the inlet line 2' in by-passing relationship to the raidator 6 and therewith to the inlet 2. The line branch 5 combines with the line branch 7 downstream of the radiator 6 within a thermostat 8, which permits the cooling medium to reach the inlet 2 alternately from the by-pass line 7 or from the branch line 5. The thermostat 8 contains a temperature-sensing and expansion element 9 which alternately controls two disk valves 10 and 11.

Figure 2:
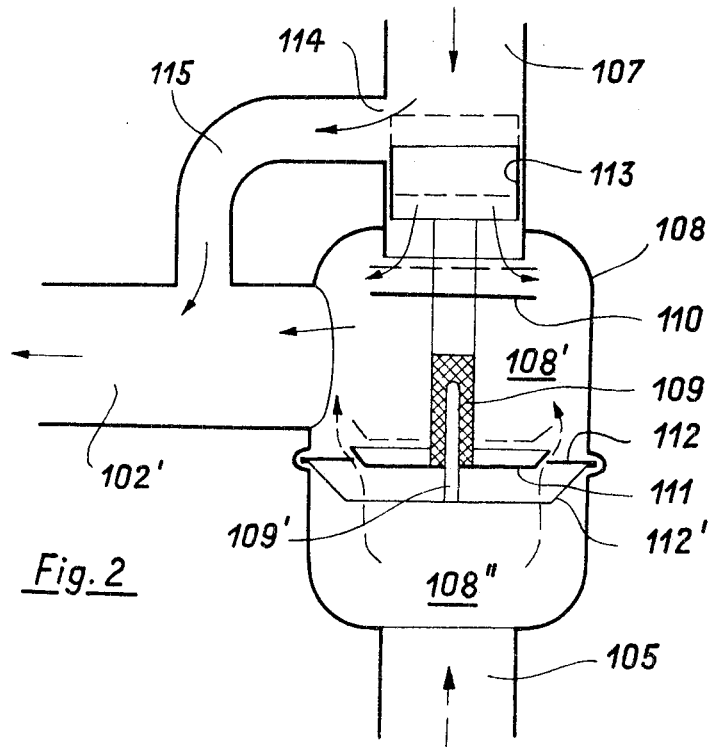
FIG. 2 is a somewhat schematic cross-sectional view through a thermostat in accordance with the present invention having a controlled by-pass line.

According to FIG. 2, the thermostat 108 comprises two disk valves 110 and 111 which control alternately the passage from the by-pass line 107 and from the branch line 105. The temperature-sensing an expansion element 109 is arranged at the disk valve 111 on the side thereof facing the disk valve 110 and extends into the partial space 108' of the thermostat 108; the by-pass line 107 and the discharge line 2', 102' leading to the cooling packet 1' terminate in partial space 108'. The temperature-sensing and expansion element 109 is supported by way of a bolt 109' and bracing 112' at the cross wall 112 closed by the disk valve 111. The cross wall 112 separates the inner space 108' from the second inner space 108'' of the thermostat 108; the line branch 105 from the radiator 6 terminates in partial space 108''. An annular slide valve member 113 is secured at the disk valve 110 which, together with the disk valve 111, is displaced by the temperature-sensing and expansion element 109. Consequently, the annular slide valve member 113 is moved in unison with the two disk valves 110 and 11 and controls an aperture 114 for a further by-pass line 115 leading from the by-pass line 107 to the inlet line 2', 102'. A portion of the cooling medium flowing from the by-pass line 107 to the inlet line 2', 102' is kept away in this manner from influencing the temperature-sensing and expansion element 109. The temperature-sensing and expansion element 109 is thereby acted upon by a mixture temperature which is influenced more strongly by the temperature of the cooling medium from the radiator 6 than corresponds to the mixture ratio of the cooling medium supplied to the cooling jacket 1' through the inlet line 2', 102'. In case of high ambient or surrounding temperatures and thus with a corresponding high temperature of the cooling medium which flows into the thermostat 108 through the branch line 105, the temperature-sensing and expansion element 109 is influenced in this manner by a higher mixture temperature than in case of a lower ambient or surrounding temperature and therewith with a lower temperature of the cooling medium out of the line branch 105. The thermostat therefore opens the disk valve 111 to a greater extent with high ambient temperature; that is, for example, during summer heat, than with lower ambient temperature, for example, during winter colds. Simultaneously therewith, the annular slide valve member 113 closes the aperture 114 more with a high temperature than with a low temperature. As a result thereof, a higher mixture temperature is adjusted in the inlet line 2', 102' with a lower ambient temperature, i.e., during the winter than with a higher outside temperature, as in the summer. The internal combustion engine 1 is thus kept during winter at a higher operating temperature than in the summer. Several advantages result therefrom, especially an enhanced effectiveness of a vehicle heating system of passenger motor vehicles is made possible thereby during the winter and during the summer an enhanced cooling and especially thereby also an improved cooling of the lubricating oil is achieved thereby. The higher heat radiation of the engine as a result of the greater temperature drop during winter is thereby partially compensated for.

According to FIG. 3, the effect described above is achieved in a simple manner by another construction of the thermostat 8 according to FIG. 1 in that the temperature-sensing and expansion element 9 extends through the disk valve 11 arranged in the cross wall 12 and into the partial space 8″ in which terminates the branch line 5 from the radiator 6. The pressure bolt 9′ of the temperature-sensing and expansion element 9 thereby emerges out of the temperature-sensing and expansion element at a place remote from the disk valve 11 and is supported again by way of bracing 12′ at the cross wall 12 and therewith at the housing of the thermostat 8. The temperature-sensing and expansion element 9 is acted upon with the section 9″ thereof arranged in the partial space 8″ directly by the cooling medium conducted out of the radiator 6 through the line branch 5. A low ambient or outside temperature and therewith a lower temperature of the cooling medium from the branch line 5 has as a consequence that a predetermined opening of the disk valve 11 can be achieved only by a relatively high mixture temperature in the thermostat partial space 8′ which acts upon the portion of the temperature-sensing and expansion element 9 that is located in the partial space 8′. This relatively high mixture temperature is, at the same time, the temperature which is supplied by way of the inlet line 2′ to the cooling jacket 1′. With high ambient and outside temperature, in contrast thereto, the cooling medium within the partial space 8″ also has a high temperature so that the part 9″ of the temperature sensing and expansion element 9 is thereby acted upon by a relatively high temperature. The portion of the temperature-sensing and expansion element 9 which is arranged in the partial space 8′, therefore requires with high outside temperatures only an acting upon by a lower mixture temperature in the partial space 8′ for purposes of achieving the same opening of the disk valve 11 as was assumed above for a low ambient temperature. Consequently, with a high outside temperature, a lower mixture temperature flows into the cooling jacket 1′ through the inlet line 2′ out of the space 8′ than with lower ambient temperature. The desired difference between the cooling medium temperature in the partial space 8′ and therewith the temperature which the cooling medium has that is supplied to the cooling jacket 1′ may be determined by matching the portions of the temperature-sensing and expansion element 9 which are arranged on both sides of the disk valve 11. This matching also enables a cooling medium temperature that remains far-reachingly constant with different outside temperatures. The same effect and matching could also be achieved by guide surfaces within the thermostat space 8′ which either conduct increasingly the cold cooling medium passing through the valve 11 out of the radiator 6 to the temperature-sensing and expansion element 9 or which increasingly keep away the warm or hot cooling medium out of the by-pass line 7 from influencing the temperature-sensing and expansion element 9.

Regulating curves 16 and 17 of conventional thermostat constructions are illustrated in FIG. 4 of which the regulating curve 16 is coordinated to a thermostat for summer operation and the regulating curve 17 to a thermostat for winter operation. These two regulating curves 16 and 17 may become effective only by exchange or readjustment of the thermostat for a single internal combustion engine. As shown in this diagram, the danger thereby exists that with the use of a thermostat having the regulating curve 16, the internal combustion engine is operated at low outside temperatures U with the cooling medium temperatures K which are below the aimed-at temperature range 18 which is tantamount to an overcooling of the internal combustion engine and has as a consequence a high wear. The point 16′ represents, for example, an operating point with the cooling medium temperature $K_{16}$, which adjusts itself with an ambient temperature $U_1$ that corresponds to an average winter temperature. The point 16″ represents the cooling medium temperature $K_{16″}$ which adjusts itself with an ambient temperature $U_1$ that corresponds to an average winter temperature. The point 16″ represents the cooling medium temperature $K_{16″}$ with an average summer ambient temperature $U_2$. If a so-called winter thermostat having the higher regulating curve 17 is utilized during high ambient temperatures, then the cooling medium temperature increases and therewith the operating temperature of the internal combustion engine rises above the aimed-at range 18 which may lead to overheating of the cooling medium and of the internal combustion engine with known disadvantageous consequences. The point 17″ of the regulating curve 17 shows, for example, such an operating condition having the cooling medium temperature $K_{17″}$ at the summer-like ambient temperature $U_2$. The operating point $17_2$ during the winter-like ambient temperature $U_1$, in contrast thereto, lies in that case with the cooling temperature $K_{17′}$ within the temperature range 18, according to the purpose of a winter thermostat.

The regulating curves 19, 20, and 21 correspond to thermostat constructions according to the present invention in which the temperature-sensing and expansion element is acted upon by a cooling medium mixture temperature which is influenced more strongly by the cooling medium component out of the radiator than corresponds to the prevailing mixture ratio of the cooling medium flowing through the inlet line 2′ to the cooling jacket 1′. The flat regulating curve 19 which has a far-reachingly constant cooling medium temperature over a wide range of ambient temperatures, is thereby still slightly influenced by the cooling medium component out of the radiator 6. The regulating curves 20 and 21 correspond to thermostat constructions with correspondingly stronger influence by the cooling medium component from the radiator 6. By an appropriate matching of the thermostat construction according to FIGS. 2 and 3, regulating curves can be determined which lie at will between and above the curves 16, 19, 20 and 21. For example, with the assumed ambient temperatures $U_1$ and $U_2$, the operating point 19′ having a cooling medium temperature $K_{19′}$ and the operating point 19″ having the cooling medium temperature $K_{19″}$ are obtained with the regulating curve 19. Both operating points 19′ and 19″ lie within the aimed-at temperature range 18 with nearly constant cooling medium temperature. The operating point 20′ and 20″ are obtained with the regulating curve 20 which exhibit with the lower ambient temperature $U_1$ a higher cooling medium temperature $K_{20′}$ than with the higher ambient temperature $U_2$ producing the cooling medium temperature $K_{20″}$. The regulating curve 21 shows an even further reinforcement of this characteristic whereby the operating point 21′ at the lower ambient temperature $U_1$ lies with its cooling medium temperature $K_{21′}$ considerably above the normally aimed-at temperature range 18. The operating point 21″ for the high ambient temperature $U_2$ lies also in this case with its cooling medium temperature $K_{21″}$ within the temperature range 18. The regulating curve 21 thus represents a regulating characteristic which does justice particularly well and effectively to the underlying task of the present invention to adjust during winter a higher operating temperature than during the summer.

The steeply rising portion of the regulating curves disposed along the right end of each curve is determined exclusively by the dimensions of the radiator 6 and is displaced toward the right with larger radiator dimensions to a higher ambient temperature. Thus, there is no causal connection with a construction and design of the thermostat and its regulating curve in accordance with the present invention so that this steeply rising portion lies outside the operating range of the internal combustion engine by a sufficiently large dimensioning of the radiator.

While I have shown and described several embodiments in accordance with the present invention, it is understood that the same is not limited thereto but is susceptible of numerous changes and modifications as known to a person skilled in the art. For example, the present invention is not limited in its application to circulating cooling systems but may also be used with temperature mixing installations having an open circuit.

Consequently, I do not wish to be limited to the details shown and described herein but intend to cover all such changes and modifications as are encompassed by the scope of the appended claims.

I claim:

1. A temperature-regulating device for a mixture consisting of several media having different temperatures, comprising housing means provided with individual inlet means for each of said media and outlet means for said mixture, a unitary temperature sensing element in said housing means having a continuous control surface acted upon by said media of different temperature, and valve means responsive to said temperature sensing element for selectively opening and closing said inlet means, a first portion of said control surface of said temperature sensing element being arranged in a first space in said housing in which the said media are mixed, a second portion of the control surface of said temperature sensing element being arranged in a second space in said housing containing only one of said media.

2. The combination according to claim 1, wherein said housing means is provided with inlet aperture means for the media to be mixed, said temperature-sensing element being arranged within a space in said housing means provided with said inlet aperture means, valve means actuated by said temperature-sensing element for valving said inlet aperture means, said temperature-sensing element being secured at said valve means and extending therethrough into a space within said housing means that contains only one of the media to be mixed.

3. The combination according to claim 2, wherein the temperature-regulating device is operable as thermostatic mixture regulating means for the cooling system of an internal combustion engine and has two valves controlling alternately the supply of the cooling medium to the engine from a line containing the radiator and from a by-pass line by-passing said radiator, the temperature-sensing element extending through that valve which controls the line containing the radiator.

4. The combination according to claim 3, wherein the temperature-sensing element is arranged with an effective surface portion of 10 to 40% thereof within the space into which terminates the line containing the radiator.

5. A temperature-regulating device for a mixture consisting of several media having different temperatures, comprising housing means and temperature sensing means in said housing means acted upon by said media having different temperatures, wherein said housing means is provided with a plurality of aperture means, two supply lines being connected with two of said aperture means, said temperature-sensing means being arranged within a space of said housing means including said two aperture means, valve means operatively connected with said temperature-sensing means for reciprocally valving the said two inlet aperture means of said space, the media to be mixed flowing into said space through the two aperture means which are controlled by said valve means and the mixed media flowing off through another aperture means which is open and is connected with a discharge line, a further by-pass line operatively connected with one of said supply lines upstream of the inlet aperture means thereof and discharging into said discharge line in by-passing relationship to said space, and further valve means for said further by-pass line operatively connected with said temperature-sensing means and controlled in the same sense as the valve means valving the inlet aperture means of said one supply line.

6. The combination according to claim 5, wherein said temperature-sensing means is constructed as thermostatic mixture regulating device for the cooling system of an internal combustion engine having two valves which control alternately the supply of the cooling medium to the engine out of a line containing the radiator and out of a by-pass line, the further by-pass line directly connecting the by-pass line with said discharge line forming the feed line for the cooling medium to be supplied to the engine.

References Cited
UNITED STATES PATENTS

| 2,355,043 | 8/1944 | Adlam | 236—12 X |
| 2,425,439 | 8/1947 | Puster | 236—34.5 |
| 2,636,684 | 4/1953 | Stokes | 236—12 |
| 1,985,929 | 1/1935 | Jorgensen | 236—12 |

EDWARD J. MICHAEL, Primary Examiner